United States Patent [19]

Mächler et al.

[11] Patent Number: 4,496,416
[45] Date of Patent: Jan. 29, 1985

[54] METHOD AND APPARATUS FOR ADJUSTING AND MOUNTING OPTICAL COMPONENTS IN OPTICAL INSTRUMENTS

[75] Inventors: Meinrad Mächler, Ellwangen; Richard Sachse, Königsbronn; Horst Stacklies, Aalen; Achim Schindler, Oberkochen, all of Fed. Rep. of Germany

[73] Assignee: Carl-Zeiss-Stiftung, Heidenheim, Fed. Rep. of Germany

[21] Appl. No.: 478,892

[22] Filed: Mar. 25, 1983

[30] Foreign Application Priority Data

Mar. 31, 1982 [DE] Fed. Rep. of Germany ....... 3211867

[51] Int. Cl.³ .............. B29C 19/00; B32B 31/00; B31F 5/00; B65H 29/00
[52] U.S. Cl. ..................... 156/293; 156/64; 156/379; 156/556; 350/417
[58] Field of Search ............ 156/64, 99–109, 156/293, 349, 378, 379, 539, 556, 559, 560, 575; 350/417, 537, 542, 545

[56] References Cited

U.S. PATENT DOCUMENTS

| | | | |
|---|---|---|---|
| 2,225,039 | 12/1940 | Diggins | 156/99 X |
| 2,635,289 | 4/1953 | Owens | 156/102 X |
| 3,064,717 | 11/1962 | Morrealle et al. | 156/293 X |
| 3,184,359 | 5/1965 | Lissac | 156/556 X |
| 4,277,141 | 7/1981 | Kleiber | 156/559 X |

*Primary Examiner*—William A. Powell
*Attorney, Agent, or Firm*—Stonebraker, Shepard & Stephens

[57] ABSTRACT

For the adjustment and mounting of an optical component in an optical instrument, the optical component is held by an adjusting device not forming part of the instrument. After the adjusting process is completed, the component is attached to the instrument by a liquid or pasty substance which solidifies with slight change in volume. The optical component or its mount and the instrument are so developed that a form-locked, force-locked, or adherence-locked attachment is produced between them. The adjusting process can be made objective by a position-resolving receiver; the evaluation of the adjustment image and the carrying out of the adjustment movements can be effected by a computer which can also carry out the entire adjustment process completely automatically. After the firm attachment of the optical component to the instrument, the adjusting device is removed.

18 Claims, 22 Drawing Figures

METHOD AND APPARATUS FOR ADJUSTING AND MOUNTING OPTICAL COMPONENTS IN OPTICAL INSTRUMENTS

BACKGROUND OF THE INVENTION

The prevent invention relates to a method and an apparatus for adjusting and mounting optical components in optical instruments.

Optical instruments generally consist of numerous optical components which must be adjusted accurately with respect to each other and to the chassis of the instrument in order for the optical instrument to have the properties desired. For this reason the optical components are generally arranged with adjustable holders on an instrument chassis, frame, or the like. Depending on the number of degrees of freedom which are necessary for the adjustment, such holders require a large number of manufacturing steps and are thus expensive. Frequently, after adjustment has been effected the position must still be secured against unintentional change by additional measures such as clamps or varnish. Adjustable holders in various embodiments have been known for a long time. Various possibilities are described, for instance, in the book by M. Pollermann, "Bauelemente der physikalischen Technik."

An inexpensive adjustable mounting is known from West German Utility Model or Gebrauchsmuster No. 73 34 958, dated Apr. 10, 1975. In that case the optical element or its mount is fastened on an intermediate part which is developed as a bridge and is connected to a base plate by four plastically deformable webs bent at an angle of 90°. The adjustment of the optical element is effected by systematic plastic deformation of the webs of the intermediate piece, to produce displacement or tilting of the optical element as desired.

It is furthermore known to insert lenses and mirrors in centered position within plastic rings and in this way facilitate the further mounting and adjustment. In West German Pat. No. 892 523, published Oct. 8, 1953, the lens or mirror is grasped for this purpose on both sides by annular clamps which exert practically no friction, the clamps being arranged concentrically in the chamber or a plastic press. A plastic composition is then injected into the press. This provides the lens or mirror at its periphery with a plastic ring, the periphery of this ring being thus centered with respect to the optical axis of the lens.

In Austrian Pat. No. 346 626, published Nov. 27, 1978, the lens is arranged between two clamping tubes to which a fluid is fed under pressure for the centering.

Finally, it is also known to cover optical systems such as field glasses in mounted and adjusted condition with a plastic which simultaneously protects the optical parts and assures that they are held together. This has been described, for instance, in British Pat. No. 1 208 746, published Oct. 14, 1970. At the same time, a practical easily handled outer shape can be assured.

These known methods are unsatisfactory in many respects: The covering presupposes a system which has been adjusted entirely properly. The centered mounting of round components takes care of only a small part of the optical adjustment work. The plastically deformable holder still requires considerable expense for manufacture, in addition to experience and skill in adjustment.

The object of the present invention is therefore to provide a method and an apparatus for the adjusting and mounting of optical components in instruments which, at minimum expense and with the greatest possible precision, permits adjustment in up to three directions in space and around up to three axes in space, and makes it possible to fix the adjustment in time as well as thermally in a very stable fashion.

SUMMARY OF THE INVENTION

The object is achieved by the invention in the manner that the optical component or its mount is connected to the optical instrument chassis or body during the adjusting process only by an adjusting device which is not part of the instrument, that after the adjusting process the optical component or its mount is firmly attached to the instrument by a solidifying substance, and that thereupon the adjusting device is removed.

For the attaching of the optical component or its mount to the instrument there are preferably used liquid or pasty substances which solidify with little change in volume and therefore remain dimensionally stable. These requirements are satisfied, for instance, by plaster of paris and many adhesives which cure by themselves or under the action of radiation or heat. It is particularly preferred to employ substances whose hardening process is reversible, since in this way there is the possibility of repeating the adjustment process later. Such substances comprise, for instance, sulfur or low-melting alloys.

The invention may be practiced in a number of ways, including the following possibilities which are suitable for the development of the optical components or their mounts and of the instrument:

A. Parts of the optical component or its mount extend into one or more hollow spaces in the instrument. The parts and the hollow spaces are so developed that the optical part is sufficiently movable for the adjustment. In such case it is sufficient if a so-called form-locked attachment is produced by the fastening substance upon its solidification in the hollow spaces.

B. The optical component or its mount and the instrument are so developed that one or more interstices are produced between them. The interstice or interstices are so developed that the optical part is sufficiently movable for adjustment. In this case a so-called force-locked attachment must be produced by the fastening substance upon its solidification in the interstices.

C. The optical component or its mount and the instrument are developed in such a manner that two approximately parallel surfaces are produced between them. The space between these surfaces is so dimensioned that the optical component is still just sufficiently movable for the adjustment. In this case the fastening substance must wet the surfaces and a so-called adherence-locked attachment must be produced upon its solidification, as is true, for instance, in the case of adhesives or solders.

In actual practice a combination of two or three of these possibilities is frequently present.

The adjusting process itself can be carried out in conventional fashion by forming an image by means of the optical component. If only direction is of importance, then a laser is sufficient, with which it is also possible to produce imaging without a defined image plane. For the evaluation of the image it is advantageous to use a position-resolving receiver with which objective data are obtained as compared with visual evaluation. Furthermore, in such case one is not limited to the visible region. For this purpose, for instance, a plumbicon or a television tube can be used. A diode array is particularly advantageous since its position resolution is extremely constant. As image, a precisely defined one- or two-dimensional geometric pattern is advantageous.

For a number of adjusting tasks the spectrum of a line beam produced by a dispersion element can also be used. This is particularly advantageous in the case of spectrographs and spectrometers, since the wavelengths of the lines are accurately known and are absolutely constant. For a part of the adjustment work the position-resolving receiver can also be a part of the instrument.

During the adjustment and fastening process the optical component or its mount is advisedly connected to a manipulator, which in its turn is connected to the instrument. The optical component or its mount can be held by the manipulator in known manner, e.g., mechanically, electromechanically, or by vacuum cup. Even easily soluble adhesive bondings are possible. The manipulator can be moved in up to three directions in space and be turnable around up to three axes in space.

In many optical instruments a so-called sequential adjustment process is possible in which one optical component after the other is adjusted and fastened. In this case one manipulator is sufficient although several manipulators are frequently more efficient for manufacture. For some optical instruments a so-called iterative adjustment method is better or even necessary, in which the optimal condition can be reached only via repeated adjustment of all optical components. In this case, several manipulators are necessary.

It is, of course, possible to displace the manipulators by hand and effect the adjustment in this manner. In a further advantageous embodiment of the invention the manipulators are provided with actuators which are controlled by a computer. In that way it is possible to carry out very easily even very small adjustment movements in any desired direction and around any desired axis with very great precision.

In one particularly advantageous embodiment the position-resolving receiver is also connected to the computer for the evaluation of the image. The computer then compares the precisely defined one- or two-dimensional geometrical desired pattern with the actual pattern projected by the optical component, and determines the nature and size of the misadjustment or error. The step from the evaluation of the image to the change in the adjustment can be taken either by a human operator or by the compute program. In the latter case, the members, optical component or components, position-resolving receiver, computer, and manipulator or manipulators form one or more control circuits and the computer changes the adjustment of the optical component or components until the deviation between the desired pattern and the actual pattern has become zero or as small as possible. With a good, capable computer program the adjustment processes are carried out very rapidly and very accurately in this manner.

While in the previously known methods the optical components are first of all mounted (with adjustable mounts) in the instrument and then adjusted, the sequence employed in the method of the present invention is precisely the opposite, i.e., the optical parts are first adjusted to proper position relative to the instrument chassis or body, and are then attached to the instrument.

The advantages obtained by the invention reside, in particular, in the fact that minimal expense is required for the individual instrument (due to the elimination of the adjustable mounts) and that there are excellent possibilities for making the adjustment processes objective and automatic. These advantages apply not only to instruments which are manufactured in large production series (when the expense for manipulators and computer divided by the number of instruments gives a small value), but also in the case of small production series and individual instruments if it is seen to it that the optical components or their mounts are easily replaceable on the manipulators and the computer programs are of modular design.

Further advantages are the minmum amount of space required (due to the elimination of all displaceable intermediate members between optical component and housing) and the fact that the displacement of the optical component during the adjustment process in one direction or around one axis has no effect on the other possibilities of displacement.

In contradistinction to this, adjusting screws for an adjustable mounting, for instance, do not act in only one direction or around only one axis, unless a very great expense is incurred. Furthermore, the attachment of the optical components after completion of the adjustment, in accordance with the invention, is carried out very rapidly and without interaction between the various components. At very little expense one obtains an attachment which is constant in time and under the action of heat. A metallic attachment between optical components and the instrument results, in operation, in a rapid equalization of temperature and this avoids mechanical stresses upon changes in temperature. Furthermore, a vacuum-tight connection between optical component and instrument is possible.

BRIEF DESCRIPTION OF THE DRAWINGS

The invention will be described in further detail below with reference to a few illustrative embodiments shown in the drawings, in which.

DESCRIPTION OF THE PREFERRED EMBODIMENTS

Figure 1A:
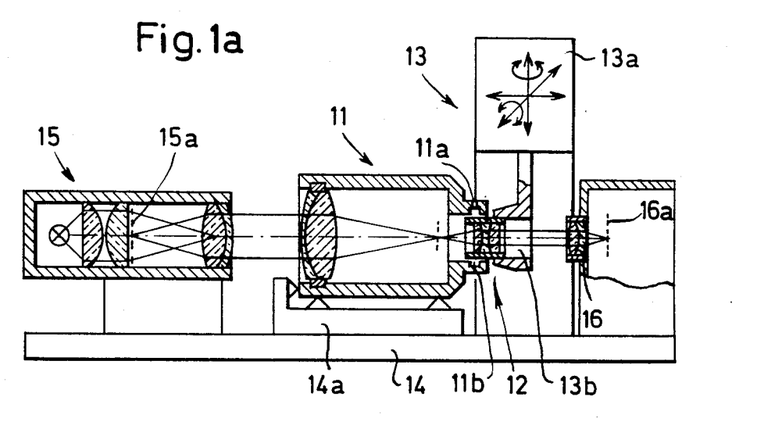
FIG. 1a shows the basic construction of an adjusting device for telescopes.

In FIG. 1a, 11 is a telescope whose ocular 12 is to be adjusted and mounted. For this purpose it is held by the arm 13b of the manipulator indicated in general at 13.

This arm can be moved in all three directions in space and turned around two axes, as is diagrammatically indicated by the arrows in the part 13a. (Turning around the optical axis of the ocular is not necessary since the lenses of the ocular are of rotational symmetry to the optical axis.) During the adjustment process the manipulator 13 is attached to the base plate 14 on which the holding device 14a for the telescope 11 is also seated, the clamping device for the holder device not being shown. On the base plate 14 there is also fastened a collimator 15 which illuminates the image 15a used for the adjustment process and focuses it at infinity.

On the other side of the telescope there is the auxiliary optical system 16 which projects an infinitely remote image in the imaging plane 16a. At this place there is provided, in the simplest case, a ground-glass plate for visual observation, which is generally carried out with the aided eye. Alternatively, in another construction, a position-resolving receiver is arranged for the objective evaluation of the image.

Figure 1B:
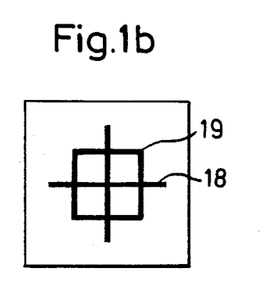
FIGS. 1b to 1e are examples of the images produced in FIG. 1a on the position-resolving receiver.
Figure 1C:
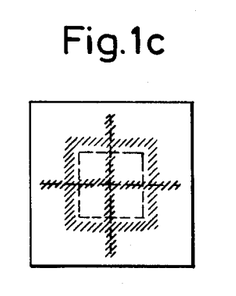
Figure 1D:
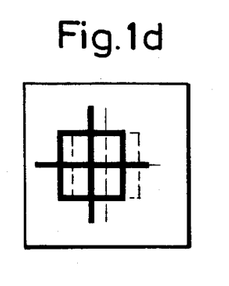
Figure 1E:
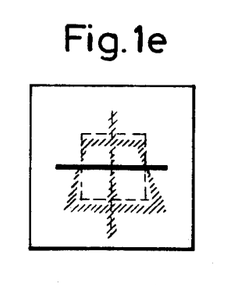

An example of a suitable image for the adjustment, which is brought into the plane 15a of FIG. 1a, is shown in FIG. 1b. It consists of a cross 18 which is located centrally in a square 19. FIGS. 1c to 1e show the images produced in the imaging plane 16a of FIG. 1a when the following misadjustments are present: out-of-focus, lateral decentering and tilting around the horizontal axis, the long dash lines indicating the position of the image when correctly adjusted. In practice, of course, combinations of such misadjustments are present in practically all cases, so that personal image evaluation requires some experience and practice. By means of a position-resolving receiver having a connected computer the evaluation is not only made objective but is also substantially simplified. In particular, when using diode arrays it is advantageous for the image to consist of luminous lines on a black backgroung, i.e., for instance, a photographic negative of FIG. 1b. Another advantageous step development is computer-controlled adjustment, as shown by way of example in FIG. 3, which will be described in further detail below. After adjustment has been effected, the ocular 12 is fixed in position by pouring a solidifying substance, for instance printer's type metal, through the channel 11a into the annular depression 11b, and after it solidifies the manipulator 13 is removed.

Figure 2A:
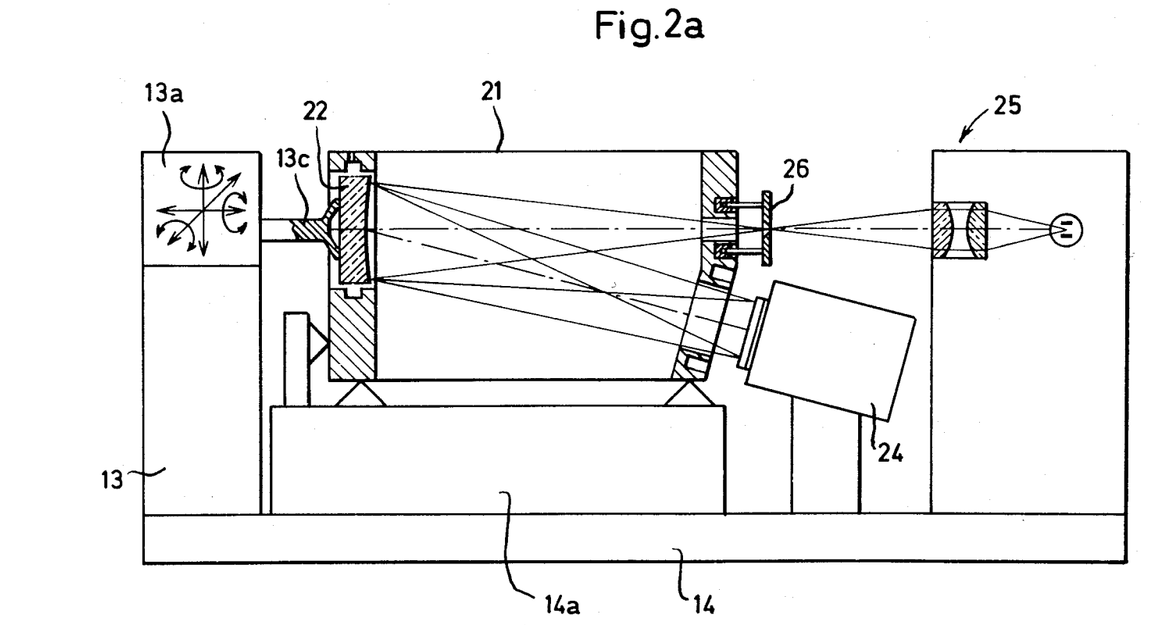
FIGS. 2a and 2b show the basic construction of an adjusting device for a spectrometer.
Figure 2B:
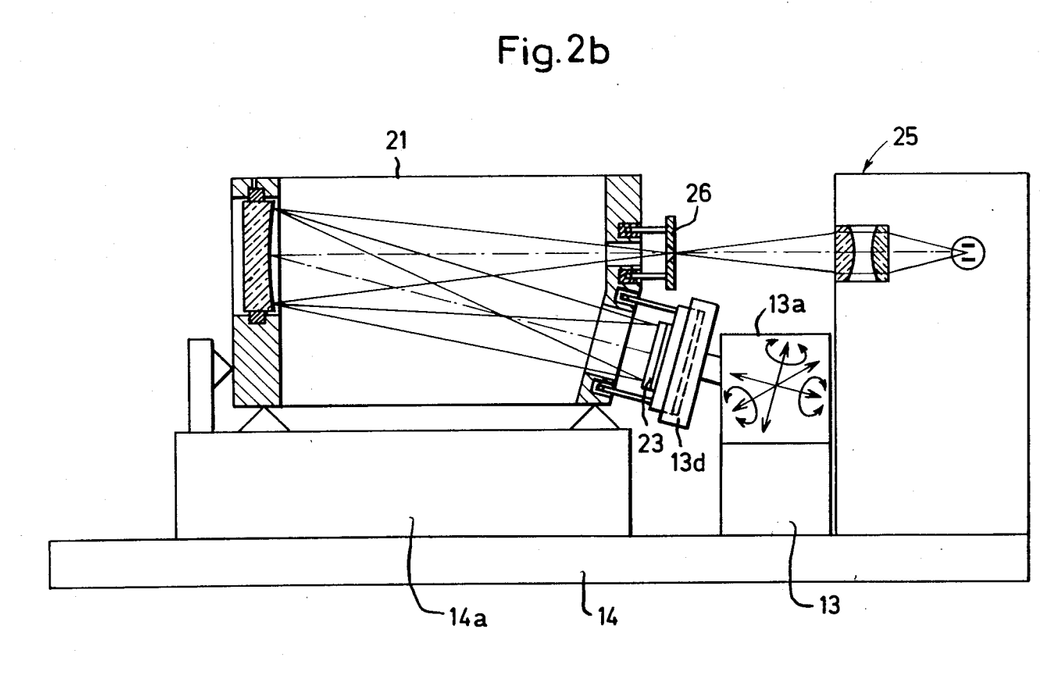

FIGS. 2a and 2b show as a further example, a construction for the adjustment of a spectrometer. The concave grating 22 of the spectrometer is the optical component which is being adjusted in FIG. 2a, and the diode line 23 is the component being adjusted in FIG. 2b. In FIG. 2a a position-resolving receiver 24 not forming part of the instrument is used for the development of the image while in FIG. 2b the diode line 23 which forms part of the spectrometer is used for this purpose. In both cases a line radiator, for instance a HgCd lamp, is projected onto the entrance slit 26 of the spectrometer by the illuminating device 25. The spectrum which is produced by the concave grating 22 is evaluated, the position of the lines of this spectrum being precisely known.

The spectrometer is attached, in a manner corresponding to FIG. 1, by a suitable conventional clamping device (not shown) to the holding device 14a mounted on the base plate 14. The manipulators 13 with their displacement members 13a are also seated on this base plate 14. The required possibilities for displacement depend on the adjustment tasks which are to be performed. The concave grid 22 can be held, for instance, by the manipulator by means of a vacuum cup 13c (FIG. 2a). The diode line 23 is seated, in the example shown in FIG. 2b, in a housing which is held by the mechanical tong 13d of the manipulator 13.

Figure 2C:
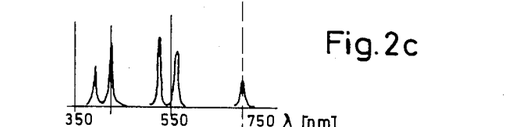
FIGS. 2c to 2f are examples of the images produced in FIGS. 2a and 2b on the position-resolving receiver.
Figure 2D:
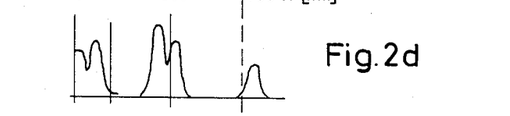
Figure 2E:
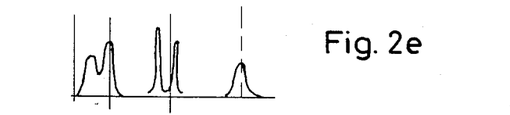
Figure 2F:
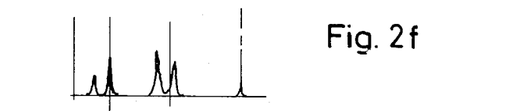

FIG. 2c shows as example of the spectrum of an HgCd lamp, only a few important lines being shown and they being shown excessively wide for the sake of clarity. FIG. 2d shows the picture of the spectrum on the receiving plane with improper focusing; the lines are broadened and the distance between the maxima no longer agree. In FIG. 2e the grating or the receiver is tilted around its center axis and perpendicular to the plane of the drawing in FIG. 2a of 2b; the middle lines lie correctly and have the correct width while the outer lines are somewhat shifted and too wide. FIG. 2f shows improper adjustment in height; the energy of all lines is too low. In this case also, combinations of all possible errors in adjustment are possible of course in practice so that objective evaluation by a position-resolving receiver combined with evaluation by a computer affords advantages.

When the adjustment of the grating 22 is completed, the annular space around it, shown empty in FIG. 2a, is filled with the solidifying substance as seen in FIG. 2b, which holds the grid in place and the manipulator 13 is then removed. Similarly, when the part 23 is properly adjusted, the cavities receiving the legs of its mount are filled with the solidifying substance.

Figure 3:
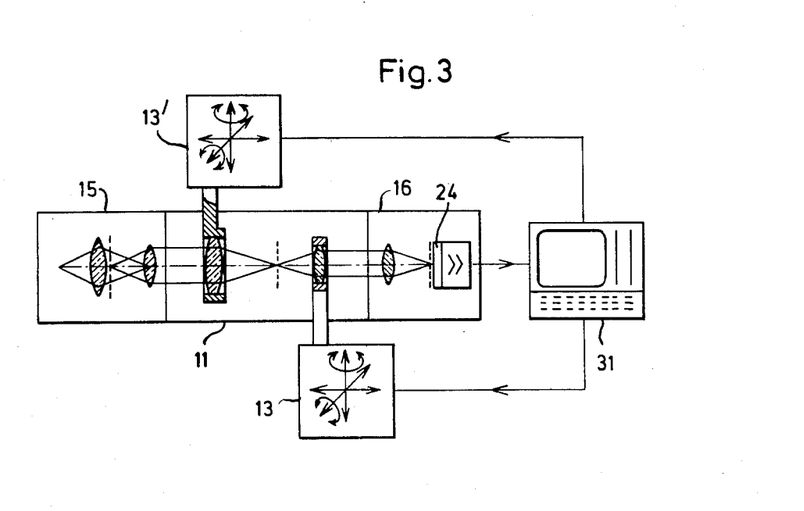
FIG. 3 is a block diagram for an adjusting device with a computer.

FIG. 3 shows a further development of the method of adjustment, using an example the adjustment of a telescope. The manipulators 13 and 13' are provided with actuators which are connected to the computer 31. The computer 31 is furthermore connected to the position-resolving receiver 24. The other reference numerals correspond to those in FIG. 1a. By means of the computer an objective evaluation is effected of the image present on the position-resolving receiver 24. The following possibilities exist for the further procedure:

1. The evaluation of the image is displayed or printed out by the computer. Thereupon, the desired changes in the adjustment are introduced into the computer by the operator. The computer transforms these data into the necessary displacement movements and actuates the corresponding actuators of the manipulators 13 and 13'.

2. The computer operates as a process computer and automatically carries out the displacement movements. Therefore there are one or more control circuits.

The first possibility has the advantage over the known methods of adjustment of being objective and comfortable but still leaves the possibility of free decision and the obtaining of experience. It is useful especially in the case of small series (small volume of production) and new instruments, in connection with which sufficient information as to the best manner of procedure upon the adjustment has not yet been gathered. The second possibility affords the advantage of automatic adjustment but requires a higher programming expense for the computer.

Figure 4A:
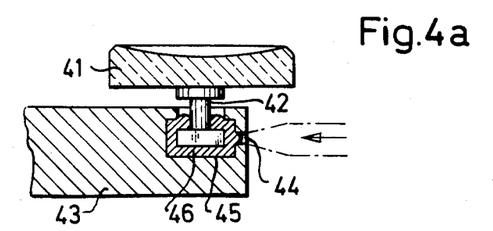
FIGS. 4a to 4c show examples of the attachment of a mirror.
Figure 4B:
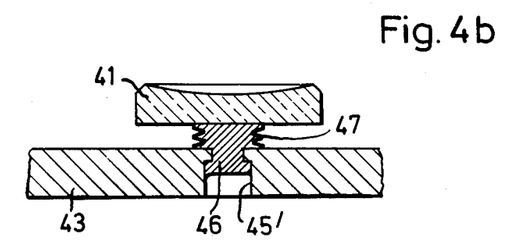
Figure 4C:
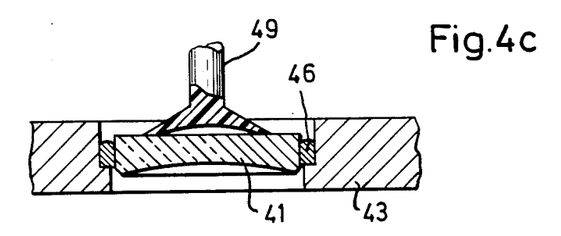

FIGS. 4a to 4c show examples of the attachment of mirrors. In FIG. 4a, 41 is a concave mirror which is firmly attached, for instance by bonding, to a central mount 42. This mount extends into a hollow space 45 in the instrument 43, but does not touch the instrument and has sufficient mobility for adjustment in all necessary degrees of freedom within the hollow space. When the concave mirror has been properly adjusted, the hollow space 45 is filled, for instance, with a bonding substance 46 through the channel 44, the substance solidifying with little change in volume. In this case a so-called form-locked attachment is effected by the development of mount and hollow space.

Another possible embodiment is shown in FIG. 4b. In this case a slightly compressed folded bellows 47, which may be made, for instance, of plastic, is seated between the concave mirror 41 and the instrument chassis 43. Its task is merely to provide a limited volume for the attaching substance. The development of a suitable hollow space 45' in the instrument 43 is simpler in this case, due to the passage hole, than in FIG. 4a. The attaching substance 46 again forms a form-locked attachment to the instrument 43 but an adherence-locked attachment to the mirror 41. In this case the manipulator holding device (not shown) must act directly on the periphery of the concave mirror 41, while it can act on the upper part of the mount 42 in the case of FIG. 4a.

FIG. 4c shows an embodiment for a force-locked attachment between the concave mirror 41 and the instrument 43. The attaching material 46 fills the groove between the two parts. This groove must, of course, again be sufficiently wide to assure sufficient mobility for the adjustment of the mirror. The groove can be filled over its entire periphery with the attaching material 46; however, a short length at three points approximately 120° apart from each other is also sufficient. The mounting of the manipulator can in this case be effected, for instance, by a vacuum cup 49 on the rear of the concave mirror.

The embodiments shown in FIGS. 4a to 4c are, of course, suitable in the same way for all other types of mirrors, reflection-refraction gratings, and many other optical components.

Figure 5:
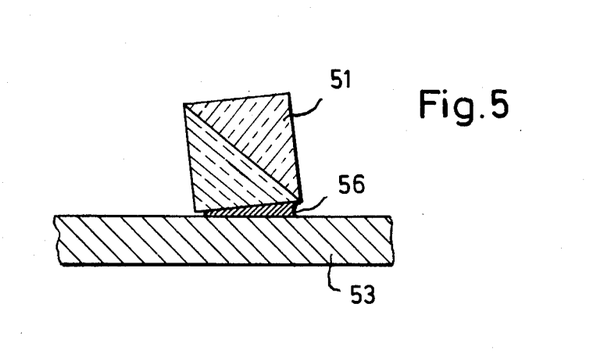
FIG. 5 shows an example of the attachment of a splitter cube.

One particularly simple embodiment for the attachment of numerous optical components is shown in FIG. 5, using as example a beam-splitter cube 51. The latter is fastened on the corresponding instrument part 53 merely by an adherence-locked attachment 56, all other aids being dispensed with.

Figure 6A:
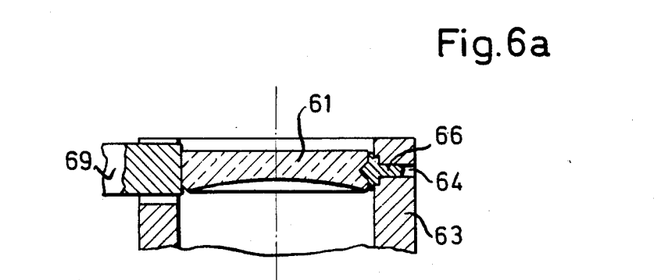
FIGS. 6a and 6b show examples of the attachment of a lens.
Figure 6B:
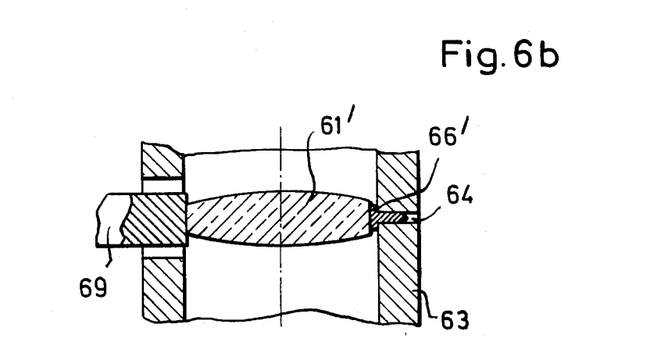

FIGS. 6a and 6b show examples of the attachment of lenses 61 and 61' respectively in an instrument part 63 developed as a tube. In both cases the attaching substance is introduced through the channel 64. In FIG. 6a a form-locked attachment 66 is produced in the direction of the optical axis while in FIG. 6b a force-locked attachment 66' (aside from the section in the channel 64) is produced. During the adjustment and fastening process the lenses 61 and 61' respectively are held by the clamping devices 69 at three or more points of their periphery. The attachment 66 therefore does not extend over the entire periphery of the lenses, but is limited to at least three places.

Figure 7:
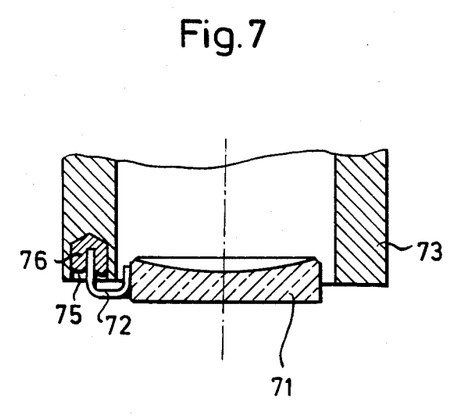
FIG. 7 shows another example of the attachment of an optical element such as a lens or mirror.

A further possibility of attaching lenses or mirrors is shown in FIG. 7. Here there are bonded to the optical component 71 at least three mounting parts 72 which extend into corresponding hollow spaces 75 in the instrument part, developed, for instance, again as a tube 73. These mounting parts 72 are fastened in the cavities of the instrument by a force-locked attachment 76 formed by the solidifying substance. In the case of a reflecting component 71 a vacuum cup can hold the rear of the part during the adjustment and fastening process, while in the case of a transmitting component the holding can be effected at the mounting parts 72.

Figure 8:
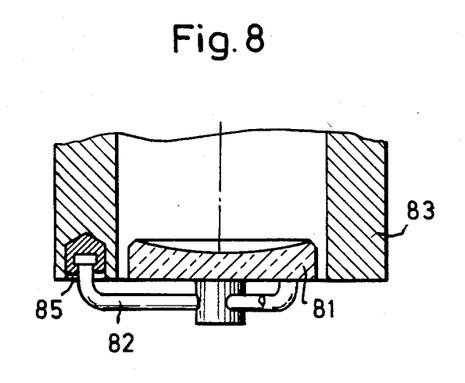
FIG. 8 shows another example of the attachment of a mirror.

A similar embodiment for reflecting components is shown in FIG. 8. The mount 82 is fastened centrally to the optical component 81. This is of particular advantage when the coefficients of thermal expansion of the tube 83 and the optical component 81 differ. In this case the mount 82 is developed for form-locked attachment at the places where it extends into the hollow spaces or cavities 85, while the hollow space itself is developed for a force-locked attachment. This is advantageous when the material of the mount 82 is relatively smooth and the material of the tube 83 has a certain amount of porosity due to which in the latter case interlocking with the fastening substance takes place.

Figure 9A:
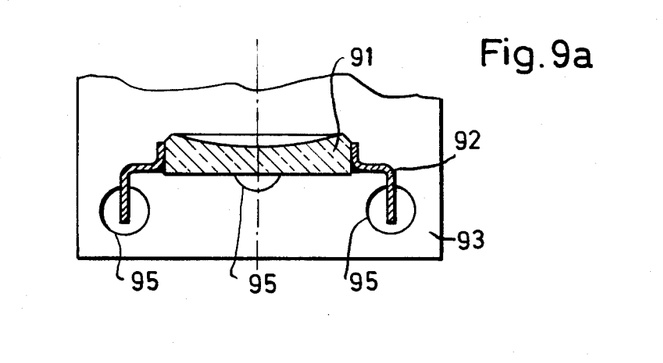
FIGS. 9a and 9b show an example of the attachment of an optical component perpendicularly to a plane of the instrument.
Figure 9B:
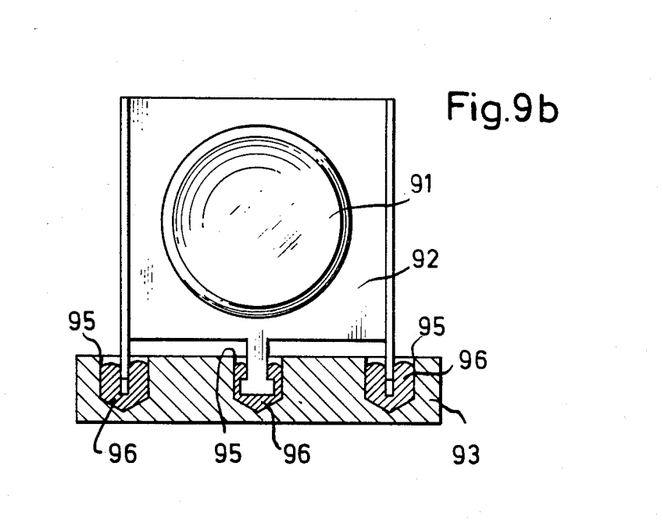

A final example, FIGS. 9a and 9b show the attachment of an optical component 91 which is perpendicular to an instrument plate 93. The optical component 91 is seated in a mount 92 having three feet which extend into the hollow spaces 95 of the instrument plate 93. In this case also, the attaching substance 96 forms a form-locked attachment to the feet of the mount and a force-locked or form-locked attachment to the instrument plate, as a function of the porosity or roughness of the latter.

From what has been described above, it will be realized that, in practicing the invention, it is immaterial whether the adjusting device emerges directly with the optical component itself, as in FIGS. 2a and 4c, or whether it engages with a mount which holds or contains the optical component, as in FIGS. 1a and 2b. Therefore, to cover both situations without employing alternative expressions, the term "optical unit" will be used in the claims, this term being intended to mean either the optical component or the mount which holds the optical component.

What is claimed is:

1. The method of adjusting the position of an optical unit relative to an optical instrument and mounting the optical unit on the optical instrument when the proper adjusted position has been determined, which comprises the steps of:
    (a) providing an optical instrument;
    (b) providing an optical unit to be adjusted relative to and then mounted on said instrument;
    (c) providing an adjusting device separate from said instrument and capable of supporting said optical unit and also capable of moving said optical unit in a plurality of directions in space and of rotating it about a plurality of axes of rotation in space;
    (d) attaching said device to said instrument and supporting said unit on said device;
    (e) operating said device to effect precise adjustment of said unit relative to said instrument while said unit is unconnected to said instrument except through said device;
    (f) firmly attaching said unit and said instrument to each other in the adjusted position of said unit by applying between adjacent portions of said unit and said instrument a flowable substance capable of hardening to form a firm connection; and
    (g) detaching said device from said unit and said instrument and removing said device, after said substance has hardened, leaving said unit mounted in adjusted position on said instrument and maintained in said position by said hardened substance.

2. The invention defined in claim 1, wherein said optical unit is attached to said instrument by a liquid or pasty substance which solidifies with slight change in volume.

3. The invention defined in claim 2, wherein said substance is a substance the soldification process of which is reversible.

4. The invention defined in claim 3, wherein said substance is a low-melting alloy.

5. The invention defined in claim 2, wherein said optical unit is developed in the manner that parts extend into at least one hollow space of the instrument, the hollow space being so developed that the optical unit is sufficiently movable for the intended adjustment, and that, after adjustment has been effected, the attaching substance is introduced into said hollow space and forms a form-locked attachment upon its solidification.

6. The invention defined in claim 2, wherein said optical unit and said instrument are developed in such a manner that a gap or gaps are produced between them, the gap or gaps being so developed that the optical unit is sufficiently movable for the intended adjustment, and that after adjustment the attaching substance is introduced into said gaps and forms a force-locked attachment upon its solidification.

7. The invention defined in claim 2, wherein said optical unit and said instrument are developed in such a manner that two approximately parallel surfaces are produced between them, the space between the surfaces being so developed that the optical unit is sufficiently movable for the adjustment, and that after the adjustment has been effected by the attaching substance is introduced into said space and upon its solidification forms an adherence-locked attachment by bonding or soldering.

8. The invention defined in claim 1, characterized by the fact that during the adjusting process an image is projected by the optical component onto a locus-resolving receiver, and that the adjusting process is carried out while continously observing said image and comparing it with the desired image.

9. The invention defined in claim 8, characterized by the fact that the image is a spectrum of a line radiator, produced by a dispersion element.

10. The invention defined in claim 8 characterized by the fact that the adjusting process is carried out automatically with the aid of a control circuit.

11. Apparatus for adjusting and mounting optical units in optical instruments, said apparatus comprising a manipulator adapted to be detachably mounted on an optical instrument, said manipulator having means for holding an optical unit, said manipulator including means for moving said optical unit held by the manipulator through adjusting movements in up to three directions in space and turning said unit around up to three axes in space.

12. The invention defined in claim 11, characterized by the fact that of a plurality of optical units each is connected to one manipulator.

13. The invention defined in claim 11, comprising a position-resolving receiver constituting a component part of said instrument.

14. The invention defined in claim 11, wherein said manipulator or manipulators are equipped with actuators which are connected to a computer.

15. The invention defined in claim 14, characterized by the fact that said computer is connected to a position-resolving receiver.

16. The invention defined in claim 15, characterized by the fact that said optical unit, position-resolving receiver, computer, and manipulator are connected to form one or more control circuits.

17. The invention defined in claim 1, characterized by its use in particular for telescopes, theodolites, and spectrometers.

18. The invention defined in claim 11, characterized by its use particularly for telescopes, theodolites, and spectrometers.

* * * * *